United States Patent
Hayashi et al.

(10) Patent No.: US 9,493,619 B2
(45) Date of Patent: Nov. 15, 2016

(54) METHOD FOR PRODUCING POROUS POLYTETRAFLUOROETHYLENE FILM AND POROUS POLYTETRAFLUOROETHYLENE FILM

(71) Applicant: SUMITOMO ELECTRIC FINE POLYMER, INC., Sennan-gun, Osaka (JP)

(72) Inventors: Fumihiro Hayashi, Osaka (JP); Hiroyuki Tsujiwaki, Osaka (JP); Aya Murata, Osaka (JP); Atsushi Uno, Osaka (JP)

(73) Assignee: SUMITOMO ELECTRIC FINE POLYMER, INC., Sennan-gun, Osaka (JP)

(*) Notice: Subject to any disclaimer, the term of this patent is extended or adjusted under 35 U.S.C. 154(b) by 0 days.

(21) Appl. No.: 14/758,625

(22) PCT Filed: Jun. 23, 2014

(86) PCT No.: PCT/JP2014/066556
§ 371 (c)(1),
(2) Date: Jun. 30, 2015

(87) PCT Pub. No.: WO2015/002002
PCT Pub. Date: Jan. 8, 2012

(65) Prior Publication Data
US 2015/0353694 A1 Dec. 10, 2015

(30) Foreign Application Priority Data
Jul. 1, 2013 (JP) .................................. 2013-138215

(51) Int. Cl.
*C08J 5/18* (2006.01)
*B01D 67/00* (2006.01)
*B01D 71/36* (2006.01)
*B29C 55/00* (2006.01)
*B01D 69/06* (2006.01)
B29K 27/18 (2006.01)
B29L 7/00 (2006.01)

(52) U.S. Cl.
CPC .............. *C08J 5/18* (2013.01); *B01D 67/0027* (2013.01); *B01D 69/06* (2013.01); *B01D 71/36* (2013.01); *B29C 55/005* (2013.01); *B01D 2323/08* (2013.01); *B01D 2325/24* (2013.01); *B01D 2325/30* (2013.01); *B29K 2027/18* (2013.01); *B29L 2007/008* (2013.01); *C08J 2327/18* (2013.01)

(58) Field of Classification Search
None
See application file for complete search history.

(56) References Cited

U.S. PATENT DOCUMENTS

| 5,510,176 A * | 4/1996 | Nakamura ............. B01D 71/36 |
| | | 428/316.6 |
| 2011/0052900 A1* | 3/2011 | Uno ..................... B01D 61/147 |
| | | 428/304.4 |

FOREIGN PATENT DOCUMENTS

| CN | 1102748 A | 5/1995 |
| CN | 101580598 A | 11/2009 |
| CN | 103100310 A | 5/2013 |
| JP | H03-174452 A | 7/1991 |
| JP | H03-221541 A | 9/1991 |
| JP | 2012-045524 A | 3/2002 |
| JP | 2010-094579 A | 4/2010 |
| JP | 2011-052175 A | 3/2011 |
| WO | WO-2008/018400 A1 | 2/2008 |
| WO | WO-2010/092938 A1 | 8/2010 |

OTHER PUBLICATIONS

Choi et al., "Structure Development in Multistage Stretching of PTFE films," from Journal of Polymer Science: Part B: Polymer Physics, vol. 48, 2248-2256 (2010), Wiley Periodical, Inc.*
U.S. Office Action dated May 23, 2016 that issued in U.S. Appl. No. 14/758,641 including double patenting rejections on pp. 2-4.
U.S. Appl. No. 14/758,641, filed Jun. 30, 2015, Hayashi, et al.

* cited by examiner

Primary Examiner — Kara Boyle
(74) Attorney, Agent, or Firm — Drinker Biddle & Reath LLP

(57) ABSTRACT

Provided is a method for producing a porous polytetrafluoroethylene film having good chemical resistance, good heat resistance, a high porosity, and good dimensional stability. The method for producing a porous polytetrafluoroethylene film includes a stretching step of stretching a sheet-like molded body composed of a fluororesin containing polytetrafluoroethylene as a main component in a longitudinal direction and/or a lateral direction at a temperature lower than a melting point of the fluororesin to make a porous fluororesin film, and, after the stretching step, an annealing step of holding the porous fluororesin film in a shape-fixed state, and maintaining the porous fluororesin film at a temperature lower than the melting point of the fluororesin but not lower than a temperature 30° C. lower than the melting point for 1 to 20 hours.

4 Claims, No Drawings

METHOD FOR PRODUCING POROUS POLYTETRAFLUOROETHYLENE FILM AND POROUS POLYTETRAFLUOROETHYLENE FILM

TECHNICAL FIELD

The present invention relates to a method for producing a porous polytetrafluoroethylene (PTFE) film composed of a fluororesin containing polytetrafluoroethylene as a main component and used as, for example, a filter (separation membrane) for filtration of liquids, and a porous polytetrafluoroethylene film.

BACKGROUND ART

Porous films composed of a fluororesin containing PTFE as a main component (porous PTFE films) are used as, for example, filters for removing fine impurity particles from a liquid because they have good chemical resistance, good heat resistance, good mechanical strength, etc. and a porous structure having a uniform and fine pore size can be easily obtained.

Porous PTFE films used as filters and the like can be produced by stretching a sheet obtained by molding a PTFE powder to make a sheet. For example, PTL 1 (paragraphs 0026 to 0038) discloses a method for producing a porous stretched PTFE sheet (porous PTFE film), the method including the steps of 1) molding a kneaded product of a high-molecular-weight PTFE unsintered powder and a liquid lubricant into a sheet by paste extrusion, 2) stretching the sheet to prepare a porous film, and 3) sintering the stretched porous film (in order to prevent the film from shrinking after the stretching).

CITATION LIST

Patent Literature

PTL 1: No. WO2010/092938

SUMMARY OF INVENTION

Technical Problem

With the recent miniaturization of semiconductor circuits, it has been desirable to remove fine particles that affect the performance of electronic elements from pure water and liquid chemicals used for producing the electronic elements. Accordingly, it is desirable that porous PTFE films used as filters in the production of electronic elements have a property enabling fine particles to be removed with a higher trapping ratio, in addition to high chemical resistance, high heat resistance, and a high porosity.

In the production of electronic elements, filtration of pure water and liquid chemicals is often performed at a high temperature of about 80° C. Existing porous PTFE films have a problem in that the films shrink when used at such a high temperature. In particular, with an increase in the porosity, porous PTFE films tend to shrink easily. Accordingly, it is desirable that porous PTFE films have a property such that the films do not shrink, even when used at such a high temperature, that is, good dimensional stability.

An object of the present invention is to provide a method for producing a porous PTFE film, the method being capable of producing a porous PTFE film having good chemical resistance, good heat resistance, a high porosity, a high collection ratio for fine particles, and good dimensional stability, and a porous PTFE film produced by the method.

Solution to Problem

An embodiment of the present invention is a method for producing a porous PTFE film, the method including a stretching step of stretching a sheet-like molded body composed of a fluororesin containing PTFE as a main component in a longitudinal direction and/or a lateral direction at a temperature lower than a melting point of the fluororesin to make a porous fluororesin film; and, after the stretching step, an annealing step of holding the porous fluororesin film in a shape-fixed state, and maintaining the porous fluororesin film at a temperature lower than the melting point of the fluororesin but not lower than a temperature 30° C. lower than the melting point for 1 to 20 hours. Another embodiment of the present invention is a porous PTFE film produced by the above method, the porous PTFE film having a shrinkage ratio in a longitudinal direction of 3% or less and a shrinkage ratio in a lateral direction of 10% or less. Note that the term "porous PTFE film" in the embodiments of the present invention refers to a porous film composed of a fluororesin containing PTFE as a main component.

Advantageous Effects of Invention

According to the production method according to an embodiment of the present invention, it is possible to obtain a porous PTFE film containing, as a main component, PTFE having good chemical resistance and good heat resistance, the porous PTFE film having not only a high porosity but also good dimensional stability. Therefore, the porous PTFE film produced by this method is suitable for use in, for example, filtration of pure water and liquid chemicals used in the production of electronic elements.

DESCRIPTION OF EMBODIMENTS

Next, embodiments for carrying out the present invention will be described specifically. It is to be understood that the present invention is not limited to the embodiments and Examples, and can be changed to other embodiments as long as the object of the present invention is not impaired.

As a result of intensive studies, the inventor of the present invention found that the above problems can be solved by a method for producing a porous PTFE film, the method including a step of stretching a sheet-like molded body composed of a fluororesin containing PTFE as a main component in a longitudinal direction and/or a lateral direction to make a porous film, in which, after the stretching, the porous film is maintained at a high temperature close to a melting point of the fluororesin for a particular period of time in a shape-fixed state. This finding led to the completion of the present invention.

The present invention provides a method for producing a porous PTFE film, the method including a stretching step of stretching a sheet-like molded body composed of a fluororesin containing PTFE as a main component in a longitudinal direction and/or a lateral direction at a temperature lower than a melting point of the fluororesin to make a porous fluororesin film; and, after the stretching step, an annealing step of holding the porous fluororesin film in a shape-fixed state, and maintaining the porous fluororesin film at a temperature lower than the melting point of the fluororesin but not lower than a temperature 30° C. lower than the melting point for 1 to 20 hours. Herein, the term "melting point" refers to a temperature of an endothermic peak due to melting of the fluororesin in a differential scanning calorimetry (DSC) curve when DSC of the fluororesin is performed after the resin is sufficiently sintered. When the fluororesin contains only PTFE, the melting point is 327° C.

According to this production method, it is possible to obtain a porous PTFE film containing, as a main component, PTFE having good chemical resistance and good heat resistance, the porous PTFE film having a high porosity and good dimensional stability (particularly in the longitudinal direction).

The phrase "contains PTFE as a main component" means that "usually contains PTFE in an amount of 50% by mass or more but may contain other resins as long as the object of the present invention is not impaired". In particular, a fluororesin containing PTFE in an amount of 80% by mass or more is preferable because good characteristics of PTFE, such as chemical resistance and heat resistance, become more significant. Accordingly, in a preferred embodiment of the method for producing a porous PTFE film of the present invention, the fluororesin containing PTFE as a main component, the fluororesin being used for producing the porous PTFE film, may contain PTFE in an amount of 80% by mass or more.

The sheet-like molded body composed of a fluororesin containing PTFE as a main component, the molded body being stretched in the stretching step, can be obtained by, for example, the method described in PTL 1. Specifically, the molded body can be obtained by kneading an unsintered powder of a fluororesin containing PTFE as a main component and a liquid lubricant, and molding the resulting kneaded product into a sheet by paste extrusion.

The unsintered fluororesin powder that can be used in this method is preferably an unsintered powder of a resin containing, as a main component, a high-molecular-weight PTFE having a number-average molecular weight of 4,000,000 or more, and more preferably an unsintered powder of a resin containing, as a main component, a high-molecular-weight PTFE having a number-average molecular weight of 12,000,000 or more. Examples of fluororesins that are other than PTFE and that may be contained in the fluororesin containing PTFE as a main component include thermoplastic fluororesins such as tetrafluoroethylene/perfluoroalkyl vinyl ether copolymers (PFA), tetrafluoroethylene/hexafluoropropylene copolymers, polychloro/trifluoroethylene, tetrafluoroethylene/ethylene copolymers, chlorotrifluoroethylene/ethylene copolymers, polyvinylidene fluoride, and polyvinyl fluoride.

Examples of the liquid lubricant include petroleum-based solvents such as solvent naphtha and white oil; hydrocarbon oils such as undecane; aromatic hydrocarbons such as toluol and xylol; alcohols; ketones; esters; silicone oils; fluorochlorocarbon oils; solutions obtained by dissolving a polymer such as polyisobutylene or polyisoprene in any of these solvents; mixtures of two or more of these; and water or aqueous solutions containing a surfactant.

The liquid lubricant is usually mixed in a ratio of 10 to 40 parts by mass, preferably 16 to 25 parts by mass relative to 100 parts by mass of the unsintered powder of a fluororesin containing PTFE as a main component. After the mixing, extrusion molding (paste extrusion) is performed.

The molding by paste extrusion is preferably performed at lower than 100° C. and usually at about 50° C. Prior to the paste extrusion, preforming is preferably performed. In the preforming, for example, the mixture is compression-molded at a pressure of about 1 to 10 MPa into a block, a rod, a tube, or a sheet.

The resulting preform obtained by the preforming is extruded with a paste extruder into a sheet. The preform can be molded into a sheet by conducting paste extrusion using a T-die. Furthermore, rolling with a calender roll or the like and drying may be conducted.

The liquid lubricant is preferably removed from the sheet-like molded body before the stretching step. The liquid lubricant can be removed by heating, extraction, dissolution, or the like.

Subsequently, the sheet-like molded body of a resin containing PTFE as a main component, the sheet-like molded body being obtained as described above, is stretched (uniaxially stretched or biaxially stretched) in a longitudinal direction and/or a lateral direction (direction perpendicular to the longitudinal direction) at a temperature lower than a melting point of the fluororesin (literature data: 327° C. in the case of a film composed of only PTFE) to make a porous fluororesin film. The biaxial stretching in the longitudinal direction and the lateral direction can be performed by the same method and under the same conditions as those of biaxial stretching conducted in the production of existing porous PTFE films.

The sheet-like molded body of the fluororesin becomes porous as a result of being stretched in the longitudinal direction and/or the lateral direction, and thus a porous fluororesin film is obtained. In order to obtain a filter having a high filtration flow rate, the stretching is preferably performed until the porosity becomes 70% or more. Accordingly, the degree of stretching is preferably selected such that the porosity exceeds 70%. Specifically, by controlling the stretching ratio in the longitudinal direction to 2 to 10 times, more preferably 3 to 8 times and controlling the stretching ratio in the lateral direction to 2 to 20 times, more preferably 5 to 10 times, a porosity exceeding 70% can be obtained without causing breakage of the film or the like. The temperature of the film during the stretching is preferably a temperature 5° C. to 30° C. lower than the melting point of the fluororesin. Accordingly, in the case of a film composed of only PTFE, the temperature is preferably in the range of 297° C. to 322° C., and more preferably in the range of 300° C. to 320° C.

After the stretching step (in the case where a sintering step is performed as described below, after the sintering step), an annealing step is performed. In the annealing step, the porous fluororesin film is held in a shape-fixed state, and in this state, the porous fluororesin film is maintained at a temperature lower than the melting point of the fluororesin but not lower than a temperature 30° C. lower than the melting point for 1 to 20 hours. The fluororesin film that has become porous in the stretching step tends to have a property of shrinking easily. A filter including a porous fluororesin film may be subjected to, for example, steam sterilization at about 130° C., and phosphoric acid cleaning at about 150° C. to 170° C. When the porous fluororesin film is used under such a high-temperature condition, the film shrinks particularly easily. In addition, with an increase in the porosity, the shrinkage ratio also tends to increase. For example, a porous fluororesin film that exhibits a high trapping ratio for fine particles, the film having been subjected to a sintering step described below, tends to have a large shrinkage ratio. However, by performing this annealing step, the shrinkage ratio can be reduced. In particular, the shrinkage ratio in the longitudinal direction can be reduced to about 1/3 to 1/6 of the shrinkage ratio before the annealing step.

The "shape-fixed state" means that a shape (specifically, the dimensions in the longitudinal direction and the lateral direction) of a film is physically fixed so that shrinking of the film does not occur even when the film is heated. Examples of the method include a method in which the sides in the longitudinal direction and the lateral direction of a film are respectively fixed with a large number of pins and a method in which a film is wound in a roll shape (by winding a film in a roll shape, shrinking of the film does not occur even when the film is heated).

The annealing temperature is a temperature lower than the melting point of the fluororesin but not lower than a temperature 30° C. lower than the melting point. Accordingly, in the case of a film composed of only PTFE, the annealing temperature is in the range of 297° C. to 327° C. When the annealing temperature is lower than the temperature 30° C. lower than the melting point of the fluororesin, the effect of reducing the shrinkage ratio (in the longitudinal direction) is not sufficiently obtained. On the other hand, when the annealing temperature is equal to or higher than the melting point of the fluororesin, the pore size of the porous PTFE film increases, and the trapping ratio for fine particles easily decreases. Furthermore, an annealing temperature equal to or higher than the melting point of the fluororesin is not suitable because, in the case where the porous fluororesin film is annealed in the form of a roll, the adjacent films are fusion-bonded to each other.

Preferably, the annealing temperature is a temperature at least 5° C. lower than the melting point of the fluororesin but not lower than a temperature 20° C. lower than the melting point. Accordingly, in the case of a film composed of only PTFE, the annealing temperature is preferably in the range of 307° C. to 322° C. In this case, the shrinkage ratio in the longitudinal direction of the film can be more reliably reduced, and an increase in the pore size can be more reliably prevented.

The time of the annealing step is 1 hour or more and 20 hours or less. When the annealing time is less than 1 hour, the effect of reducing the shrinkage ratio (in the longitudinal direction) is not sufficiently obtained. The annealing is almost completed within 20 hours. Accordingly, even if the annealing is performed for more than 20 hours, the shrinkage ratio becomes substantially constant and does not decrease. Therefore, performing annealing for more than 20 hours is not preferable from the viewpoint of productivity. The annealing time is more preferably 8 to 15 hours.

The method for producing a porous PTFE film of the present invention includes the stretching step and the annealing step described above. The method may include other steps in addition to these steps as long as the object of the present invention is not impaired.

A preferred embodiment of the method for producing a porous PTFE film of the present invention may further include, after the stretching step and before the annealing step, a step (sintering step) of sintering the porous sheet until a melting point peak of the fluororesin becomes 333° C. or lower by maintaining the porous sheet at a temperature equal to or higher than the melting point of the fluororesin for 20 seconds or less. By including this sintering step, a total surface area of resin fibers per unit volume of the film can be increased.

Herein, the term "melting point peak" means a temperature of an endothermic peak due to melting of the fluororesin in a DSC curve when DSC of the fluororesin is performed. The melting point peak is lowered by the sintering. For example, in the case where 100% PTFE is unsintered, the 100% PTFE usually has a melting point peak exceeding 340° C. However, the melting point peak can be lowered to 327° C. by sintering.

Specifically, the total surface area of resin fibers included per porous PTFE film having an area of 1 $m^2$ and a thickness of 25 μm can be made to 4,000 $m^2$ or more. When such a film is used as a filter for filtration of liquids, a porous PTFE film that removes fine particles in liquids with a high collection ratio can be obtained. The total surface area (hereinafter, may be referred to as "total surface area ratio") of resin fibers is specifically a value measured by the method described below.

[Method for Measuring Total Surface Area (Total Surface Area Ratio) of Resin Fibers]

First, a specific surface area ($m^2$/g) of a porous PTFE film is determined with a micropore distribution measuring instrument (Perm Porometer CFP-1500A: manufactured by Porous Materials, Inc.). A value calculated on the basis of the following formula from the determined specific surface area, a mass per unit area of the film (referred to as "basis weight"), and a film thickness is defined as the total surface area ratio.

Total surface area ratio=specific surface area ($m^2$/g)× basis weight($g/m^2$)×1 ($m^2$)×25 (μm)/film thickness (μm)

In general, when such a sintering step is performed, dimensional stability significantly decreases. However, the method for producing a porous PTFE film of the present invention includes the annealing step, and thus the decrease in the dimensional stability is suppressed by the annealing step. That is, this method is an embodiment in which an advantage of the present invention is particularly achieved.

The sintering can be performed by heating the whole of the sheet that has become porous in the stretching step to a temperature equal to or higher than the melting point of the fluororesin, maintaining the sheet at the temperature for 20 seconds or less to make the melting point peak 333° C. or lower, and then cooling the sheet so that the temperature of the whole porous sheet becomes lower than the melting point of the fluororesin.

PTFE transmits near-infrared rays and absorbs only far-infrared rays having a wavelength of 5 μm or more. Accordingly, an example of the method for uniformly heating the whole of the porous sheet to a temperature equal to or higher than the melting point of the fluororesin within a short time, and cooling the sheet within a short time is a method including irradiating the porous PTFE film with far-infrared rays at substantially the same intensity over the entire surface of the film. Alternatively, by transferring a long sheet using a roller, the sheet may be first passed through a preheating section so as to be preheated to a temperature lower than the melting point of the fluororesin, then passed through an atmosphere of 400° C. to 800° C. so as to be immediately heated to a temperature necessary for sintering, and then cooled. In the cooling, the whole sheet is preferably cooled to a temperature at least 50° C. lower than the melting point of the fluororesin within two seconds.

A preferred embodiment of the method for producing a porous PTFE film of the present invention may further include, after the annealing step, a shrinking step of shrinking the porous fluororesin film by 15% or more in the lateral direction by maintaining the porous fluororesin film at a temperature equal to or higher than 120° C. but lower than the melting point of the fluororesin in a state where the shape of the porous fluororesin film is not fixed (that is, shrinkable state). By including the annealing step, dimensional stability (in particular, in the longitudinal direction) is improved. However, improvement in dimensional stability in the lateral direction is insufficient. Specifically, the shrinkage ratio in the longitudinal direction can be reduced to about 1/3 to 1/6 of the shrinkage ratio before the annealing step. On the other hand, the shrinkage ratio in the lateral direction is also reduced, but the degree of the reduction is still insufficient. However, by performing this shrinking step, the shrinking ratio in the lateral direction can also be sufficiently reduced. Thus, a porous PTFE film having small shrinkage ratios in the longitudinal direction and in the lateral direction can be produced.

In the shrinking step, the temperature at which the porous fluororesin film is maintained is a temperature equal to or higher than 120° C. but lower than the melting point of the fluororesin. Specifically, the temperature is preferably in the range of 130° C. to 260° C. When the temperature maintained is lower than 120° C., the shrinkage ratio in the lateral direction cannot be sufficiently reduced.

The film is shrunk in the lateral direction by being maintained at a temperature equal to or higher than 120° C. but lower than the melting point of the fluororesin. The film is maintained until the film shrinks by 15% or more in the lateral direction. The time necessary for shrinking the film by 15% in the lateral direction differs according to the temperature maintained.

The porous PTFE film obtained by the production method of the present invention has a small shrinkage ratio in the longitudinal direction. Specifically, the shrinkage ratio in the longitudinal direction can be made to 3% or less. Herein, the shrinkage ratio is a value measured by the following method.

[Method for Measuring Shrinkage Ratio]

A film is cut to have dimensions of 60 mm in length and 100 mm in width, and is placed in a thermostatic chamber at 180° C. for 30 minutes. A value determined by [(A−B)/A]×100 (%) is defined as the shrinkage ratio of the film, where A represents a dimension of the film before the film is placed in the thermostatic chamber and B represents a dimension of the film after the film is placed in the thermostatic chamber for 30 minutes.

Furthermore, in the case where the shrinking step is performed, the shrinkage ratio in the lateral direction can be made to 10% or less. Accordingly, there is provided a porous PTFE film having good dimensional stability and produced by the method of the present invention, in which a shrinkage ratio in the longitudinal direction is 3% or less and a shrinkage ratio in the lateral direction is 10% or less. Since this porous PTFE film has small shrinkage ratios in the longitudinal direction and in the lateral direction, the film is not easily shrunk by heat even in the case where a liquid at a high temperature is filtered and thus is suitable for use in filtration of pure water and liquid chemicals in the production of electronic elements, the filtration being performed at a high temperature of about 80° C.

EXAMPLES

First, methods of measurement performed in Example and Comparative Examples below will be described.

[Method for Measuring Porosity]

A porosity is a value determined from a specific gravity (apparent specific gravity) determined in water and a specific gravity of a tetrafluoroethylene resin in accordance with ASTM-D-792.

[Method for Measuring Mean Flow Pore Size]

A mean flow pore size was measured with a micropore distribution measuring instrument (Perm Porometer CFP-1500A: manufactured by Porous Materials, Inc.) using, as a liquid, GALWICK (manufactured by Porous Materials, Inc.).

[Method for Measuring Collection Ratio for Particles]

A latex of spherical polystyrene particles (manufactured by Bangs Laboratories, Inc., Catalogue code: DS02R) having an outer diameter of about ½ of the mean flow pore size was diluted 50-fold with a 0.1% aqueous solution of polyoxyethylene(10) octylphenyl ether. The resulting solution was used as a test liquid. A prepared sample was punched into a disk having a diameter φ of 47 mm, and impregnated with isopropanol. Subsequently, the disk sample was fixed to a filtration holder (effective area: 9.61 cm$^2$), and 5 ml of the test liquid was filtered with a differential pressure of 0.42 kgf/cm$^2$. Standard particle concentrations of the test liquid and the resulting filtrate were each measured from an absorbance at 300 nm with a spectrophotometer (manufactured by Shimadzu Corporation, UV-160). A collection ratio was determined by the following formula.

Collection ratio=<1−(standard particle concentration of filtrate)/(standard particle concentration of test liquid)>×100[%]

[Method for Measuring Total Surface Area of Resin Fibers]

A total surface area of resin fibers is a value measured by the method described above.

[Method for Measuring Shrinkage Ratio]

A shrinkage ratio is a value measured by the method described above.

Example 1

[Preparation of PTFE Sheet-like Molded Body]

One hundred parts by mass of a PTFE unsintered powder (manufactured by Asahi Glass Co., Ltd.: CD123) was mixed with 16 parts by mass of solvent naphtha (liquid lubricant). The resulting mixture was compression-molded with a compression molding machine to obtain a columnar preform (preforming). This preform was extrusion-molded into a sheet using a T-die at a temperature of 50° C. and at a rate of 20 mm/min. The resulting sheet-like molded body was further rolled with a calender roll to obtain a sheet-like molded body having a thickness of 300 μm. Subsequently, the sheet-like molded body was passed through a heating roller at a roller temperature of 200° C. to remove the liquid lubricant.

[Stretching Step]

Four-fold stretching was performed at 200° C. in a longitudinal direction with a roll stretching machine. Subsequently, 10-fold stretching was performed at 130° C. in a lateral direction (direction perpendicular to the longitudinal direction) with a clip tenter stretching machine.

[Sintering Step]

Ceramic heaters (manufactured by NGK Insulators, Ltd.: INFRACERAM) were arranged in a paving stone manner on a ceiling and a bottom of a chamber that had been subjected to a thermal insulation treatment. The distance between a surface of the heater on the ceiling and a surface of the heater on the bottom was 100 mm. The PTFE sheet-like molded body stretched in the stretching step was fixed to a stainless steel frame. The PTFE sheet-like molded body with the frame was placed in the chamber in which the temperature on the surfaces of the heaters on the ceiling and the bottom was 800° C. and the atmosphere temperature was 500° C. for 10 seconds. The PTFE sheet-like molded body with the frame was then immediately taken out from the chamber and placed into an atmosphere at room temperature. A DSC measurement of the PTFE sheet-like molded body after being taken out from the chamber and placed into the atmosphere at room temperature was conducted. A single peak at 329° C. was observed, and thus the molded body was determined to be completely sintered.

The porous PTFE film obtained as described above had a thickness of 25 μm and a total surface area of resin fibers of 4,600 m². The porosity was 80%, the mean flow pore size was 65 nm, and the collection ratio for particles (product number: DS02R) having a particle size of 30 nm was 25%.

[Annealing Step]

The porous PTFE film after the sintering step was wound around a stainless steel pipe having a length of 200 mm and a diameter of 10 mm in a roll shape so that a width direction of the film corresponded to a length direction of the pipe, and the porous PTFE film was fixed in a state where shrinking did not occur. Subsequently, the porous PTFE film was annealed at 317° C. for 10 hours. The shrinkage ratios of the film after the annealing were measured in the longitudinal direction and the lateral direction by the method described above. The shrinkage ratios in the longitudinal direction and the lateral direction were 1.5% and 19.5%, respectively.

[Shrinking Step]

After the annealing, the roller was unwound, wound around a special stainless pipe whose length could be expanded and contracted, and heated to 180° C. With the lapse of time, the film shrunk in the lateral direction. Thirty minutes later, since the shrinkage ratio exceeded 15%, the film was cooled to room temperature.

The shrinkage ratios of the film after the cooling were measured in the longitudinal direction and the lateral direction by the method described above. The shrinkage ratios in the longitudinal direction and the lateral direction were 0.6% and 5%, respectively.

Comparative Example 1

The shrinkage ratios of the film in Example 1 before the annealing step was performed were measured in the longitudinal direction and the lateral direction by the method described above. The shrinkage ratios in the longitudinal direction and the lateral direction were 30% and 45%, respectively.

Comparative Example 2

Annealing was performed under the same conditions as in Example 1 except that the temperature at which the film was maintained in the annealing step was changed from 317° C. to 290° C. The shrinkage ratios of the film after the annealing were measured in the longitudinal direction and the lateral direction by the method described above. The shrinkage ratios in the longitudinal direction and the lateral direction were 10% and 27%, respectively. Subsequently, a shrinking step was performed under the same conditions as in Example 1. The shrinkage ratios of the film after the shrinking step (after cooling) were measured in the longitudinal direction and the lateral direction by the method described above. The shrinkage ratios in the longitudinal direction and the lateral direction were 8% and 9%, respectively.

Comparative Example 3

Annealing was performed under the same conditions as in Example 1 except that the temperature at which the film was maintained in the annealing step was changed from 317° C. to 330° C. The film was fusion-bonded, and the shape of the film could not be maintained.

The results of Example 1 showed that, in the case where annealing was performed at 317° C. (a temperature lower than the melting point 327° C. of PTFE but not lower than a temperature 30° C. lower than the melting point) in a shape-fixed state, and the film was then shrunk in the lateral direction at 180° C. (a temperature equal to or higher than 120° C. but lower than the melting point of PTFE), the shrinkage ratio in the longitudinal direction could be reduced to 3% or less and the shrinkage ratio in the lateral direction could be reduced to 10% or less.

In contrast, regarding Comparative Example 1, in which the preparation of a PTFE sheet-like molded body, the stretching step, and the sintering step were performed under the same conditions as in Example 1 but annealing was not performed, shrinking significantly occurred, specifically, the shrinkage ratio in the longitudinal direction was 30%, and the shrinkage ratio in the lateral direction was 45%. The comparison between Example 1 and Comparative Example 1 showed that shrinking could be markedly suppressed by annealing.

Regarding Comparative Example 2, in which the temperature of annealing was 290° C., although other conditions were the same as those of Example 1, a shrinkage ratio in the longitudinal direction of 3% or less and a shrinkage ratio in the lateral direction of 10% or less could not be satisfied, showing that the reduction in the shrinkage ratios was insufficient. Regarding Comparative Example 3, in which the temperature of annealing was 330° C., although other conditions were the same as those of Example 1, the film was fusion-bonded, and the shape of the film could not be maintained. These results showed that the temperature of annealing for achieving the advantages of the present invention was a temperature lower than the melting point of the fluororesin but not lower than a temperature 30° C. lower than the melting point.

The invention claimed is:

1. A method for producing a porous polytetrafluoroethylene film, comprising a stretching step of stretching a sheet-like molded body composed of a fluororesin containing polytetrafluoroethylene as a main component in a longitudinal direction and/or a lateral direction at a temperature lower than a melting point of the fluororesin to make a porous fluororesin film; and, after the stretching step, an annealing step of holding the porous fluororesin film in a shape-fixed state, and maintaining the porous fluororesin film at a temperature lower than the melting point of the fluororesin but not lower than a temperature 30° C. lower than the melting point for 1 to 20 hours.

2. The method for producing a porous polytetrafluoroethylene film according to claim 1, comprising, after the stretching step and before the annealing step, a step of sintering the porous fluororesin film until a melting point peak of the fluororesin becomes 333° C. or lower by maintaining the porous fluororesin film at a temperature equal to or higher than the melting point of the fluororesin for 20 seconds or less.

3. The method for producing a porous polytetrafluoroethylene film according to claim 1, further comprising, after the annealing step, a shrinking step of shrinking the porous fluororesin film by 15% or more in the lateral direction by maintaining the porous fluororesin film at a temperature equal to or higher than 120° C. but lower than the melting point of the fluororesin in a state where the shape of the porous fluororesin film is not fixed.

4. The method for producing a porous polytetrafluoroethylene film according to claim 2, further comprising, after the annealing step, a shrinking step of shrinking the porous fluororesin film by 15% or more in the lateral direction by maintaining the porous fluororesin film at a temperature equal to or higher than 120° C. but lower than the melting point of the fluororesin in a state where the shape of the porous fluororesin film is not fixed.

* * * * *